United States Patent
Venturini et al.

(10) Patent No.: US 9,954,433 B2
(45) Date of Patent: Apr. 24, 2018

(54) POWER SUPPLY AND DRIVE DEVICE FOR A PERMANENT MAGNET ELECTRIC MOTOR

(71) Applicant: PHASE MOTION CONTROL S.p.A., Genoa (IT)

(72) Inventors: Marco Venturini, Genoa (IT); Marco Calvini, Genoa (IT)

(73) Assignee: Phase Motion Control S.p.A., Genoa (IT)

( * ) Notice: Subject to any disclaimer, the term of this patent is extended or adjusted under 35 U.S.C. 154(b) by 0 days.

(21) Appl. No.: 15/498,025

(22) Filed: Apr. 26, 2017

(65) Prior Publication Data
US 2018/0034393 A1 Feb. 1, 2018

(30) Foreign Application Priority Data

Apr. 26, 2016 (IT) .................. 102016000042389

(51) Int. Cl.
*H02M 1/42* (2007.01)
*H02P 6/00* (2016.01)
(Continued)

(52) U.S. Cl.
CPC ............ *H02M 1/4225* (2013.01); *H02P 6/26* (2016.02); *H02P 6/28* (2016.02); *H02P 27/06* (2013.01);
(Continued)

(58) Field of Classification Search
CPC ............. H02M 1/12; H02M 2001/007; H02M 2001/0009; H02M 2001/0019; H02M 2001/0022; H02M 7/06; H02M 7/217
See application file for complete search history.

(56) References Cited

U.S. PATENT DOCUMENTS 5,184,057 A * 2/1993 Sakai .................. H02M 5/4585
  318/801
5,652,485 A * 7/1997 Spiegel .................. F03D 7/0272
  318/147
(Continued)

FOREIGN PATENT DOCUMENTS

EP     2955455     12/2015

OTHER PUBLICATIONS

Italian Search Report in application No. ITUA20162878 dated Apr. 26, 2016.
(Continued)

*Primary Examiner* — Yusef Ahmed
(74) *Attorney, Agent, or Firm* — Workman Nydegger

(57) ABSTRACT

Power supply and drive device for a permanent magnet motor including a full-wave voltage rectifier stage, which can be supplied with an alternating current voltage to provide a rectified voltage, a power factor corrector stage, a smoothing capacitor to provide a direct current voltage and a motor drive stage, which is supplied with the direct current voltage and provides a signal indicating the power required by the motor. The smoothing capacitor is not of the electrolytic type and the power factor corrector stage has feedback control means to generate a reference current as a function of the direct current voltage and of the signal indicating the power required and to control an input current of the power factor corrector stage as a function of the reference current.

18 Claims, 2 Drawing Sheets

(51) Int. Cl.
*H02P 6/26* (2016.01)
*H02P 6/28* (2016.01)
*H02P 27/06* (2006.01)
*H02M 1/00* (2006.01)
*H02P 6/08* (2016.01)

(52) U.S. Cl.
CPC ....... *H02M 2001/007* (2013.01); *H02P 6/085* (2013.01)

(56) References Cited

U.S. PATENT DOCUMENTS

| | | | | |
|---|---|---|---|---|
| 6,366,483 | B1* | 4/2002 | Ma | H02M 1/4216 363/37 |
| 6,397,611 | B1* | 6/2002 | Yamato | F24F 11/008 62/180 |
| 8,344,680 | B2* | 1/2013 | Kitanaka | H02P 21/06 318/400.01 |
| 8,519,653 | B2* | 8/2013 | Takamatsu | H02P 27/08 318/400.13 |
| 8,736,220 | B2* | 5/2014 | Ogawa | H02M 5/458 318/400.01 |
| 9,641,115 | B2* | 5/2017 | Chretien | H02P 21/05 |
| 9,708,744 | B2* | 7/2017 | Jung | D06F 37/304 |
| 2006/0215429 | A1* | 9/2006 | Oka | H02P 21/22 363/97 |
| 2010/0164400 | A1* | 7/2010 | Adragna | H02M 1/4225 315/294 |
| 2010/0164416 | A1* | 7/2010 | Yamada | H02M 1/12 318/400.13 |
| 2010/0302818 | A1* | 12/2010 | Chang | H02M 1/4225 363/80 |
| 2011/0038192 | A1* | 2/2011 | Kawashima | H02M 1/4233 363/127 |
| 2011/0194318 | A1* | 8/2011 | Kono | H02M 7/53875 363/37 |
| 2011/0211374 | A1* | 9/2011 | Yoshida | H02M 1/4225 363/37 |
| 2012/0086382 | A1* | 4/2012 | Peto | H02M 1/4225 318/729 |
| 2014/0133202 | A1* | 5/2014 | Tamaoka | H02M 1/4225 363/74 |
| 2014/0225545 | A1* | 8/2014 | Becerra | H02P 6/14 318/400.26 |
| 2014/0225553 | A1* | 8/2014 | Otorii | H02M 1/4225 318/722 |
| 2014/0247003 | A1* | 9/2014 | Yamasaki | G05B 19/00 318/802 |
| 2015/0123579 | A1* | 5/2015 | Liu | H02M 1/126 318/400.05 |
| 2015/0180401 | A1* | 6/2015 | Chretien | H02P 21/24 318/490 |
| 2015/0354870 | A1* | 12/2015 | Lee | F25B 31/02 62/498 |
| 2016/0380575 | A1* | 12/2016 | Tsumura | H02P 27/08 318/478 |

OTHER PUBLICATIONS

Forbes Jason et al: "Improving the dynamic response of power fqactor correctors using simple digital filters: Moving average filter comparative evaluation", 2013 IEEE Energy Conversion Congress and Exposition, IEEE, Sep. 15, 2013 (Sep. 15, 2013), pp. 4817-4819, XP032516289, DOI: 10.1109/ECCE.2013.6647348 [retireved on Oct. 24, 2013] *Left-hand column, last paragraph,; p. 4816; figure 1a*.

European Search Report for application No. EP17169312 dated Sep. 6, 2017.

Liu Jinhai et al: "Generalized DQ model of the permanent magnet synchrnous motor based on extended park transformation", 2013 1st International Future Energy Electronics Conference (IFEEC), IEEE, Nov. 3, 2013 (Nov. 3, 2013), pp. 885-890, XP032531797, DOI: 10.1109/IFEEC.2013.6687627 [retireved on Dec. 18, 2013].

* cited by examiner

POWER SUPPLY AND DRIVE DEVICE FOR A PERMANENT MAGNET ELECTRIC MOTOR

PRIORITY CLAIM

This application claims priority from Italian Patent Application No. 102016000042389 filed on Apr. 26, 2016, the disclosure of which is incorporated by reference.

TECHNICAL FIELD

The present invention relates to a power supply and drive device for a permanent magnet electric motor.

BACKGROUND OF THE INVENTION

In particular, the present invention finds advantageous, but not exclusive, application in industrial ceiling fans operated by a permanent magnet motor with electronic control and supplied with single-phase alternating voltage, to which the following description will make explicit reference without thereby losing its generality.

Industrial fans must typically operate continuously throughout the day and must be characterised by a remarkable reliability in order to operate for several years. Such fans typically comprise a permanent magnet motor electronically controlled by a power supply and drive device, which in turn is supplied with a single-phase alternating voltage and comprises in cascade, in the following order, a full-wave voltage rectifier stage to provide a rectified voltage, a power factor corrector stage, a smoothing capacitor for smoothing the oscillations of the rectified voltage and providing a dc voltage having a residual periodic oscillation, otherwise known as ripple, with a limited amplitude, and a motor drive stage, which is supplied with the dc voltage and is typically constituted by an inverter, i.e. a DC-AC converter, controlled by appropriate PWM signals.

The smoothing capacitor is an electrolytic capacitor, since only an electrolytic capacitor may have such a high electrical capacity to guarantee a ripple with a contained amplitude. Unfortunately, the electrolytic capacitor loses its electrical characteristics after a few years, typically after 7-8 years, and consequently causes a degradation of the characteristics of the whole power supply and drive device.

SUMMARY OF THE INVENTION

The object of the present invention is to provide a power supply and drive device for a permanent magnet motor, which is free from the aforesaid drawbacks and, at the same time, is easy and inexpensive to manufacture.

In accordance with the present invention it is provided a power supply and drive device for a permanent magnet electric motor and a permanent magnet motor as defined in the appended claims.

BRIEF DESCRIPTION OF THE DRAWINGS

For a better understanding of the present invention, a preferred embodiment is now described, purely by way of non-limiting example and with reference to the accompanying drawings, in which.

DETAILED DESCRIPTION OF THE INVENTION

Figure 1:
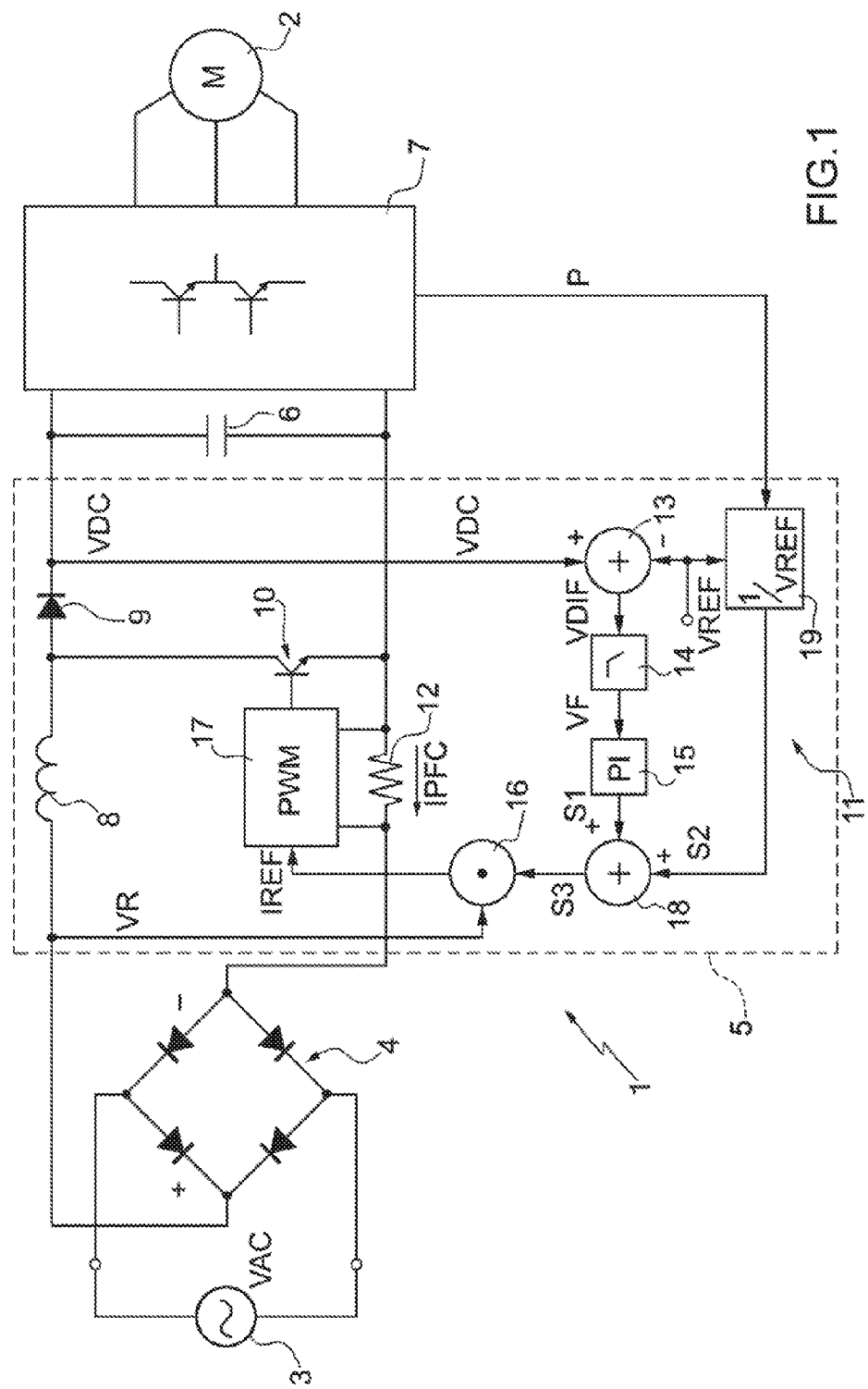
FIG. 1 shows a block diagram of the power supply and drive device according to the teaching of the present invention, inserted between a single-phase ac voltage source and a permanent magnet motor.

In the attached figure, numeral 1 indicates, as a whole, a power supply and drive device for a permanent magnet brushless motor, indicated with numeral 2, which device is powered by a voltage source with a single-phase ac current, the source being indicated with numeral 3 and the alternating voltage with VAC.

The device 1 comprises in cascade, in the following order, a full-wave voltage rectifier stage 4 supplied by the ac voltage source 3 and formed e.g. by diodes in a bridge configuration to provide a rectified voltage VR substantially coincident with the absolute value of the voltage VAC, a power factor corrector stage 5 to maintain the power factor to a value close to 1, at least one smoothing capacitor 6 to provide a dc voltage VDC and a motor drive stage 7, which comprises an inverter of known type to drive the motor 2, and in particular is supplied with the voltage VDC and can provide a signal P indicating a measure of the instantaneous power required by the motor 2.

The power factor corrector stage 5 comprises an inductor 8 connected in series to the input of the stage 5, a diode 9 connected in series to the inductor 8 so as to allow the current flow between the input and the output of the power factor corrector stage 5, an electronic switch device 10 of known type and connected in known manner between the inductor 8 and the diode 9 and a feedback control system 11, which acts on the electronic switch device 10 to control the input current IPFC of the power factor corrector stage 5.

In general, the feedback control system 11 generates a reference current IREF as a function of the voltage VDC, measured across the capacitor 6 by means known per se and therefore not illustrated, of the rectified voltage VR, measured by means known per se and therefore not illustrated, and of a preset reference voltage value VREF and controls the electronic switch device 10 as a function of the reference current IREF and of measured values of the input current IPFC. The input current IPFC is measured e.g. across a resistance 12 connected in series to the input of the power factor corrector stage 5.

In particular, the feedback control system 11 comprises an algebraic adder 13 to provide a voltage signal VDIF indicating the difference between the voltage VDC and the voltage value VREF, a low-pass filter 14 for filtering the signal VDIF, a proportional-integral controller 15 of known type acting on the filtered voltage signal VF provided by the filter 14 to obtain a signal indicated with S1, and an analogic or digital multiplier 16 to multiply, namely modulate, a signal S3, which depends on the signal S1, with the rectified voltage VR, the latter being measured by means known per se and therefore not illustrated, so as to obtain the reference current IREF. Moreover, the feedback control system 11 comprises a PWM modulator 17, which controls the electronic switch device 10 as a function of the reference current IREF and of measured values of the input current IPFC. The control of the electronic switch device 10 in fact represents a control of the input current IPFC.

The voltage value VREF represents a desired value of dc voltage across the capacitor 6 and is programmed in a known way in the power factor corrector stage 5 to be equal to a few tens of volts above the peak value of the voltage VAC. For example, if the voltage VAC has a root mean square value of 230 V, and therefore the peak value is approximately equal to 325 V, then the reference value is fixed at 400 V.

According to the present invention, the smoothing capacitor 6 is not electrolytic and preferably is of the type with a metallized film. The electrical characteristics of a metallized film capacitor decay much more slowly over time than those of an electrolytic capacitor. Moreover, the feedback control system 11 includes a divider 19, which performs a division of the signal P by the reference voltage value VREF to provide a signal S2 indicating the ratio between the instantaneous power required by the motor 2 and the desired voltage across the capacitor 6, i.e. indicating the current that the motor drive stage 7 requires from the capacitor 6. Finally, the feedback control system 11 comprises a further adder 18, which arithmetically sums the signal S2 with the signal S1 to obtain the signal S3.

Not being electrolytic, the capacitor 6 will necessarily have a relatively low electrical capacity, and this entails an increase in the number and amplitude of the harmonic components of order higher than twice the frequency of the voltage VAC. Advantageously, the filter 14 is a filter FIR (Finite Impulse Response) to completely cancel all the harmonic components present on the voltage VDC having frequencies higher than twice the frequency of the voltage VAC.

Substantially, the feedback control system 11 comprises a main current control loop, which is represented by the signal processing blocks and components indicated with 12-17, and a secondary current control loop, which is inserted in the main current control loop and is represented by the signal processing blocks indicated with 18 and 19. The secondary current control loop allows a compensation for the small electric capacitance of the capacitor 6, which causes a ripple of high amplitude on the voltage VDC so as to maintain a constant power factor, should the motor 2 require a constant power.

By way of example, should the source 3 supply a voltage VAC with a root mean square value of 230 V and a power factor equal to 1, the device 1 provided with a metallized film capacitor 6 having a capacity equal to 33 μF could supply the motor 2 with a substantially constant power equal to 1 kW, even in the presence of a ripple on the voltage VDC equal to 50%.

Figure 2:
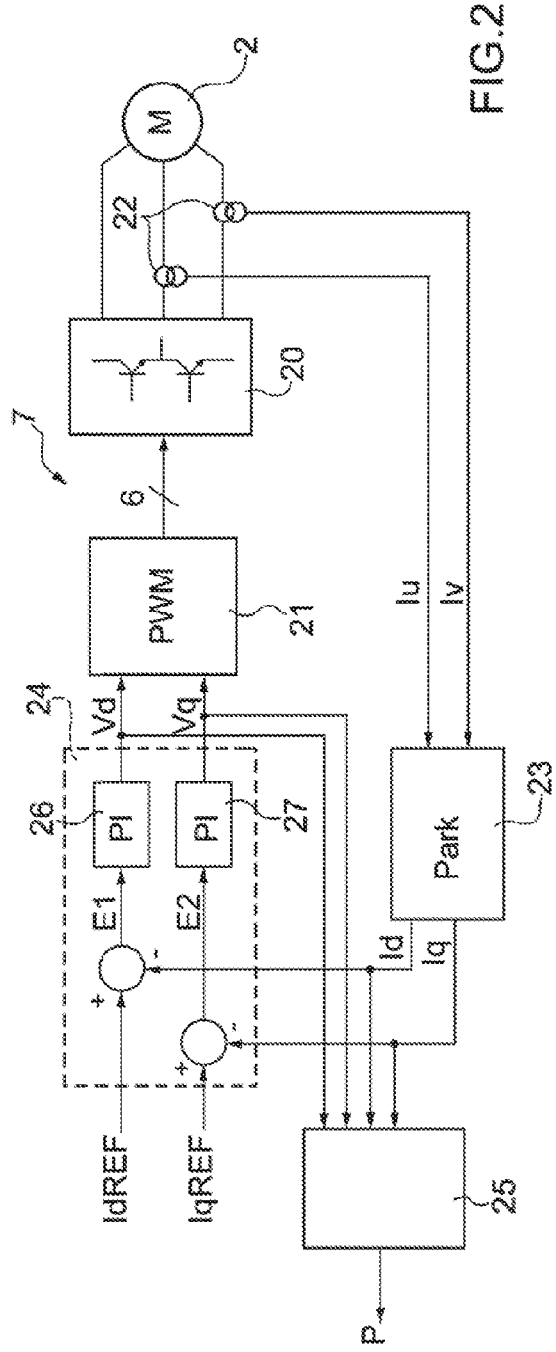
FIGS. 2 and 3 show in more detail some parts of the power supply and drive device of FIG. 1.

With reference to FIG. 2, the motor drive stage 7 comprises an inverter 20 for driving the motor 2, a PWM modulator 21 to control in known manner the inverter 20, current sensing means 22 of known type to measure at least two phase currents Iu and Iv of the motor 2, i.e. at the output of the inverter 20, and a processing block 23 configured to process the measured phase currents Iu and Iv by using the Park transform, and in particular by using a Clarke transform and a subsequent Park transform so as to obtain two currents in quadrature to each other Id and Iq. The current Id is directed like a magnetic field having the same direction as the one generated by the permanent magnets of the motor 2, while the current Iq is in quadrature (rotated by 90°) to the current Id.

The motor drive stage 7 further comprises a processing block 24 configured to determine two voltages in quadrature to each other Vd and Vq as a function of two respective error signals E1 and E2 defined by two respective differences between the two currents in quadrature Id and Iq and two corresponding preset reference currents in quadrature IdREF and IqREF, and a processing block 25 to calculate the signal P as a function of the two currents in quadrature Id and Iq and of the two voltages in quadrature Vd and Vq according to the following formula:

$$Vd \cdot Id + Vq \cdot Iq.$$

The voltages Vd and Vq are used to control in known manner the PWM modulator 21.

The reference current IdREF represents a magnetic field in the same direction as the one generated by the permanent magnets of the motor 2. Normally its value is set to zero, and in some cases is set to negative values for weakening the magnetic field in the direction of the one generated by the permanent magnets. The reference current IqREF, which is in quadrature to the other reference current IdREF, represents the required torque of the motor 2 and is calculated by a speed control device (not shown) normally associated with the motor 2.

Always referring to FIG. 2, the processing block 24 comprises a first proportional-integral controller 26 to obtain the voltage Vd as a function of the error signal E1, defined by the difference between the reference current IdREF and the current Id, and a second proportional-integral controller 27 to obtain the voltage VQ as a function of the error signal E2, defined by the difference between the reference current IqREF and the current Iq.

The signal P, calculated in the above manner, clearly represents a measure of the power required by the motor 2. The measure of the power required by the motor 2 is fundamental for compensating the ripple on the voltage VDC, said ripple having high values due to the low values of electric capacitance of the capacitor 6.

The processing blocks 23-26 are implemented e.g. by means of a programmable digital device, mounted on the same electronic board carrying the PWM modulator 21 and the inverter 20.

Figure 3:
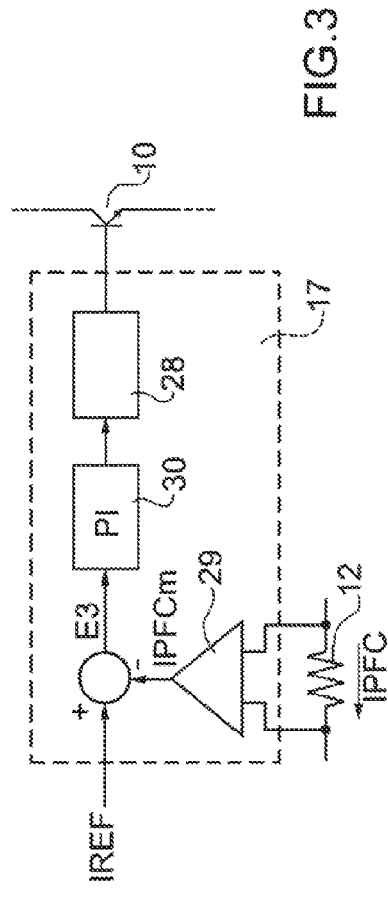

With reference to FIG. 3, the PWM modulator 17 comprises a PWM generator 28 for controlling the electronic switch device 10, a voltage comparator 29 connected with its inputs across of the resistance 12 to measure the input current IPFC and thereby provide a measured input current IPFCm, and a proportional-integral controller 30 to generate the control duty cycle of the PWM generator 28 as a function of an error signal E3 defined by the difference between the reference current IREF and the measured input current IPFC.

The invention claimed is:

1. A power supply and drive device for a permanent magnet electric motor, the power supply and drive device comprising:
    a fullwave voltage rectifier stage supplied with an alternating current voltage to provide a rectified voltage;
    at least one smoothing capacitor to provide a direct current voltage;
    a motor drive stage, which is supplied with said direct current voltage and is designed to provide a first signal indicating a measure of power required by the permanent magnet electric motor; and
    a power factor corrector stage comprising feedback control means, which are designed to generate a reference current as a function of said direct current voltage and to control an input current of the power factor corrector stage as a function of the reference current;
    wherein said at least one smoothing capacitor is not of an electrolytic type;
    wherein said feedback control means are designed to generate said reference current as a function of said first signal; and
    wherein said feedback control means comprise:

first signal processing means to obtain a second signal as a function of a voltage difference between said direct current voltage and a reference voltage value, second signal processing means to obtain a third signal as a function of a division of the first signal by said reference voltage value, and third signal processing means to obtain said reference current as a function of the second signal and of the third signal.

2. The power supply and drive device according to claim 1, wherein said first signal processing means comprise a low-pass filter to filter said voltage difference.

3. The power supply and drive device according to claim 2, wherein said low-pass filter comprises an FIR (Frequencey Impulse Response) filter.

4. The power supply and drive device according to claim 1, wherein said third signal processing means comprise signal adding means to obtain said reference current as a function of a sum of said second signal and said third signal.

5. The power supply and drive device according to claim 1, wherein said feedback control means are designed to generate said reference current as a function of said rectified voltage.

6. The power supply and drive device according to claim 5, wherein said third signal processing means comprise:

signal adding means to provide a fourth signal as a sum of said second signal and said third signal, and signal modulating means to generate said reference current by modulating said fourth signal with said rectified voltage.

7. The power supply and drive device according to claim 1, wherein said motor drive stage comprises:

an inverter to drive the permanent magnet electric motor;

current sensing means to measure at least two phase currents of the permanent magnet electric motor;

processing means to process the at least two phase currents by using a Park transform so as to:

obtain two currents in quadrature to each other, determine two voltages in quadrature to each other as a function of two respective error signals defined by two respective differences between the two currents in quadrature and two corresponding preset reference currents in quadrature, and calculate said first signal as a function of the two currents in quadrature and of the two voltages in quadrature.

8. The power supply and drive device according to claim 7, wherein said processing means comprise two proportional-integral controllers to obtain said two voltages in quadrature as a function of said two respective error signals.

9. The power supply and drive device according to claim 1, wherein:

said power factor corrector stage comprises:

an inductor;

a diode connected in series to the inductor;

an electronic switch connected between the inductor and the diode; and current-measuring means for measuring said input current; and said feedback control means further comprise PWM modulating means for controlling said electronic switch as a function of a difference between said reference current and the measured input current.

10. A power supply and drive device for a permanent magnet electric motor, the power supply and drive device comprising:

a fullwave voltage rectifier stage supplied with an alternating current voltage to provide a rectified voltage;

at least one smoothing capacitor to provide a direct current voltage;

a motor drive stage, which is supplied with said direct current voltage and is designed to provide a first signal indicating a measure of power required by the permanent magnet electric motor; and a power factor corrector stage comprising feedback control means, which are designed to generate a reference current as a function of said direct current voltage and to control an input current of the power factor corrector stage as a function of the reference current;

wherein said at least one smoothing capacitor is not of an electrolytic type;

wherein said feedback control means are designed to generate said reference current as a function of said first signal;

wherein said feedback control means comprise:

first signal processing means to obtain a second signal as a function of a voltage difference between said direct current voltage and a reference voltage value, second signal processing means to obtain a third signal as a function of a division of the first signal by said reference voltage value, and third signal processing means to obtain said reference current as a function of the second signal and of the third signal; and wherein:

said at least one smoothing capacitor is a metallized film capacitor.

11. The power supply and drive device according to claim 10, wherein said first signal processing means comprise a low-pass filter to filter said voltage difference.

12. The power supply and drive device according to claim 11, wherein said low-pass filter comprises an FIR (Frequency Impulse Response) filter.

13. The power supply and drive device according to claim 10, wherein said third signal processing means comprise signal adding means to obtain said reference current as a function of a sum of said second signal and said third signal.

14. The power supply and drive device according to claim 10, wherein said feedback control means are designed to generate said reference current as a function of said rectified voltage.

15. The power supply and drive device according to claim 14, wherein said third signal processing means comprise:

signal adding means to provide a fourth signal as a sum of said second signal and said third signal, and signal modulating means to generate said reference current by modulating said fourth signal with said rectified voltage.

16. The power supply and drive device according to claim 10, wherein said motor drive stage comprises:

an inverter to drive the permanent magnet electric motor;

current sensing means to measure at least two phase currents of the permanent magnet electric motor;

processing means to process the at least two phase currents by using a Park transform so as to:

obtain two currents in quadrature to each other, determine two voltages in quadrature to each other as a function of two respective error signals defined by two respective differences between the two currents in quadrature and two corresponding preset reference currents in quadrature, and calculate said first signal as a function of the two currents in quadrature and of the two voltages in quadrature.

17. The power supply and drive device according to claim 16, wherein said processing means comprise two proportional-integral controllers to obtain said two voltages in quadrature as a function of said two respective error signals.

18. The power supply and drive device according to claim 10, wherein:
said power factor corrector stage comprises:
an inductor;
a diode connected in series to the inductor;
an electronic switch connected between the inductor and the diode; and
current-measuring means for measuring said input current; and
said feedback control means further comprise PWM modulating means for controlling said electronic switch as a function of a difference between said reference current and the measured input current.

* * * * *